United States Patent [19]
Yoon

[11] Patent Number: 6,064,916
[45] Date of Patent: May 16, 2000

[54] HYBRID PREDICTOR, HYBRID PREDICTION METHOD, AND SYSTEM FOR AND METHOD OF CONTROLLING PROCESSES USING THE HYBRID PREDICTOR AND HYBRID PREEDITION METHOD

[75] Inventor: Jin Kyu Yoon, Seoul, Rep. of Korea

[73] Assignee: Sunkyung Engineering & Construction Limited, Seoul, Rep. of Korea

[21] Appl. No.: 08/925,723

[22] Filed: Sep. 9, 1997

[30] Foreign Application Priority Data

Apr. 29, 1997 [KR] Rep. of Korea .................. 97-16344

[51] Int. Cl.$^7$ ............................................. G05B 13/02
[52] U.S. Cl. ................... 700/44; 700/45; 700/29; 700/31
[58] Field of Search .................... 700/44, 45, 33, 700/29, 30, 31, 37

[56] References Cited

U.S. PATENT DOCUMENTS

| | | | |
|---|---|---|---|
| 5,568,378 | 10/1996 | Wojsznis | 364/164 |
| 5,740,033 | 4/1998 | Wassick et al. | 364/149 |
| 5,796,609 | 8/1998 | Tao et al. | 364/164 |

OTHER PUBLICATIONS

Jay H. Lee et al., "State–space Interpretation of Model Predictive Control", Pergamon, Brief Paper, pp. 707–717, Date unknown.

*Primary Examiner*—Paul P. Gordon
*Attorney, Agent, or Firm*—Jacobson, Price, Holman & Stern PLLC

[57] ABSTRACT

A hybrid predictor for predicting the output of a process, and a hybrid prediction method using the hybrid predictor. Also, a system for and a method of controlling a process using the hybrid predictor and hybrid prediction method are provided. In order to obtain a shifted prediction vector and step response coefficients, the hybrid predictor uses a parameter model which can be updated in accordance with a variation in the process. The control method includes the steps of predicting process output signals generated in a prediction horizon, based on input signals applied to the process, correcting the predicted values, based on output signal values measured at the next scan, comparing the corrected prediction value with a reference value to derive an error vector, calculating a control signal to minimize the error vector, and applying the control signal to the process. The hybrid predictor is characterized by an addition of a model parameter estimator and a model response converter. In this hybrid predictor, a prediction vector, which is indicative of the length of a prediction horizon, is directly calculated. Accordingly, it is possible to reduce a required memory capacity while updating model response coefficients in accordance with a variation in the process by the model parameter estimator. Thus, an adaptive prediction can be achieved.

19 Claims, 7 Drawing Sheets

HYBRID PREDICTOR, HYBRID PREDICTION METHOD, AND SYSTEM FOR AND METHOD OF CONTROLLING PROCESSES USING THE HYBRID PREDICTOR AND HYBRID PREEDITION METHOD

BACKGROUND OF THE INVENTION

1. Field of the Invention

The present invention relates to a system for and a method of controlling processes, and more particularly to a hybrid predictor and a hybrid prediction method for predicting a process output. The present invention also relates to a system for and a method of controlling processes using the hybrid predictor and hybrid prediction method.

2. Description of the Prior Art

The above-mentioned hybrid predictor is a device for generating a prediction vector by predicting a process output signal based on a process input signal in a set prediction horizon, using a model having process dynamics. The prediction vector is indicative of the predicted process output signal.

In particular, a parameter model, which can be modified in accordance with a variation in processes, is used in such a hybrid predictor. The parameter model is used to achieve a shift of prediction vectors and to obtain a step response coefficient. The hybrid predictor first predicts a process output signal based on a process input signal in a prediction horizon. Subsequently, the hybrid predictor corrects the predicted values using measured process output signals while predicting an output to be generated in a next prediction horizon, based on a process input signal value currently generated. The above procedure of the hybrid predictor is repeated to generate predicted values which are used for a process control.

It is well known that conventional feedback controllers have a limitation in controlling processes dominated by dead time and multivariable processes involving considerable interactions. In order to eliminate the limitation involved in the conventional feedback controllers, several predictive control techniques using a predictor have been developed.

Figure 1:
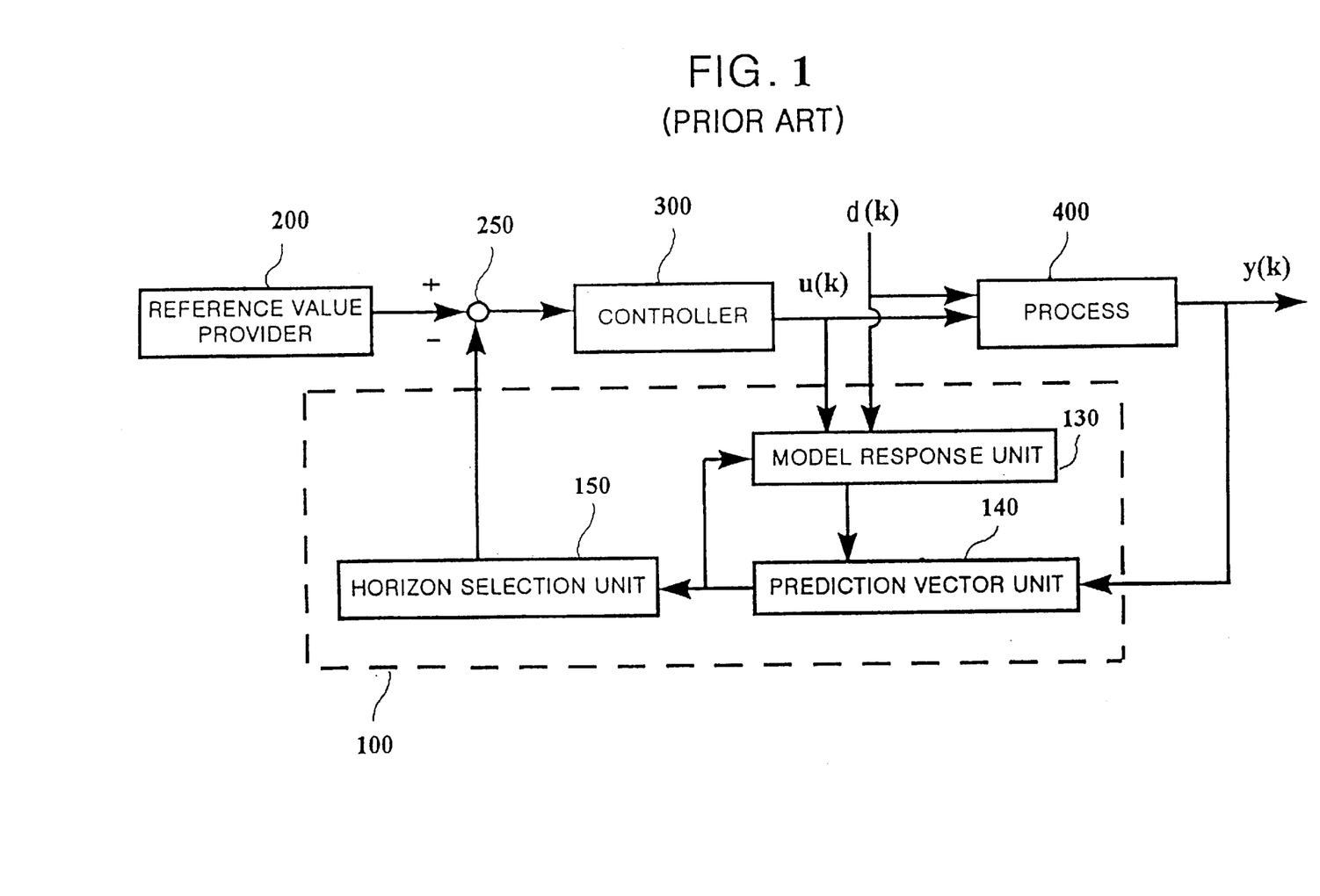
FIG. 1 is a block diagram illustrating a conventional process controller using a conventional predictor.

FIG. 1 illustrates a conventional control loop including a process controller which performs a desired control using a conventional predictor. As shown in FIG. 1, the control loop includes a predictor 100, a reference value provider 200, a subtracter 250, a controller 300, and a process 400. The predictor 100 includes a model response unit, a prediction vector unit 140 and an horizon selection unit 150.

The process 400 receives a control signal u(k−1) from the controller 300. The process 400 also receives a measurable disturbance signal d(k−1). Based on these signals u(k−1) and d(k−1), the process 400 generates a response which is a process output signal y(k). The signals u(k−1) and d(k−1) are also applied to the model response unit 130.

The model response unit 130 is stored with step response coefficients associated with the signals u(k−1) and d(k−1). Using the stored step response coefficients, the model response unit 130 outputs a model response vector indicative of a process output signal resulting from signals u(k−1) and d(k−1) applied to the process 400 at the current step.

The prediction vector unit 140 receives the model response vector from the model response unit 130 and the process output signal y(k) from the process 400. The prediction vector unit 140 corrects the model response vector based on the process output signal y(k), thereby outputting a prediction vector Y(k/k) (Y(k/k)=[y(k), . . . y(k+n−1)]).

The horizon selection unit 150 receives the prediction vector Y(k/k) from the prediction vector unit 140 and converts it into a prediction vector having a size corresponding to a prediction horizon P which is used in the controller 300.

The subtracter 250 receives the converted prediction vector from the horizon selection unit 150 and outputs an error vector which is a difference of the prediction vector from a reference vector received from the reference value provider 200. The error vector represents the difference between a desired process output and a predicted process output.

The controller 300 receives the error vector from the subtracter 250 and outputs a controller signal u(k) based on the error vector using a control algorithm.

In the above-mentioned conventional control loop, a predictor method is utilized which uses the following truncated response model (Lee, J. H., M. Morari, and C. E. Garcia, State-space Interpretation of Model Predictive Control, Automatics, Vol. 30, No. 4, pp. 707–717, 1994).

$$Y(k+1/k)=MY(k/k)+S^u\Delta u(k)+S^d\Delta d(k)$$

where, "Y(k+1/k)" corresponds to [y(k+1), y(k+2) . . . y(k+n)]$^T$ (Y(k+1/k)=[y(k+1), y(k+2) . . . y(k+n)]$^T$) and represents a prediction vector for predicting process output signals for steps from the current step k to a future step n. Also, "n" represents a model truncating order. The model truncating order is set to a value at which the process is sufficiently stable in such a manner that y(k+n)=y(k+n+1)=. . . . "S$^u$" and "S$^d$" are n×1 vectors indicative of the step response of an input signal u and a measurable disturbance signal d, respectively. In the above equation, "M" represents a vector shift matrix for shifting the vector one step. The vector shift matrix M is an n×n matrix. The matrix M and vectors S$^u$ and S$^d$ are expressed as follows:

$$M = \begin{bmatrix} 0 & 1 & 0 & \cdots & 0 & 0 \\ 0 & 0 & 1 & \ddots & 0 & 0 \\ \vdots & \vdots & \ddots & \ddots & \ddots & \vdots \\ 0 & 0 & 0 & \ddots & 1 & 0 \\ 0 & 0 & 0 & \ddots & 0 & 1 \\ 0 & 0 & 0 & \cdots & 0 & 1 \end{bmatrix} \quad S^u, S^d = \begin{bmatrix} s_1 \\ s_2 \\ \vdots \\ s_{n-2} \\ s_{n-1} \\ s_n \end{bmatrix}$$

Figure 2:
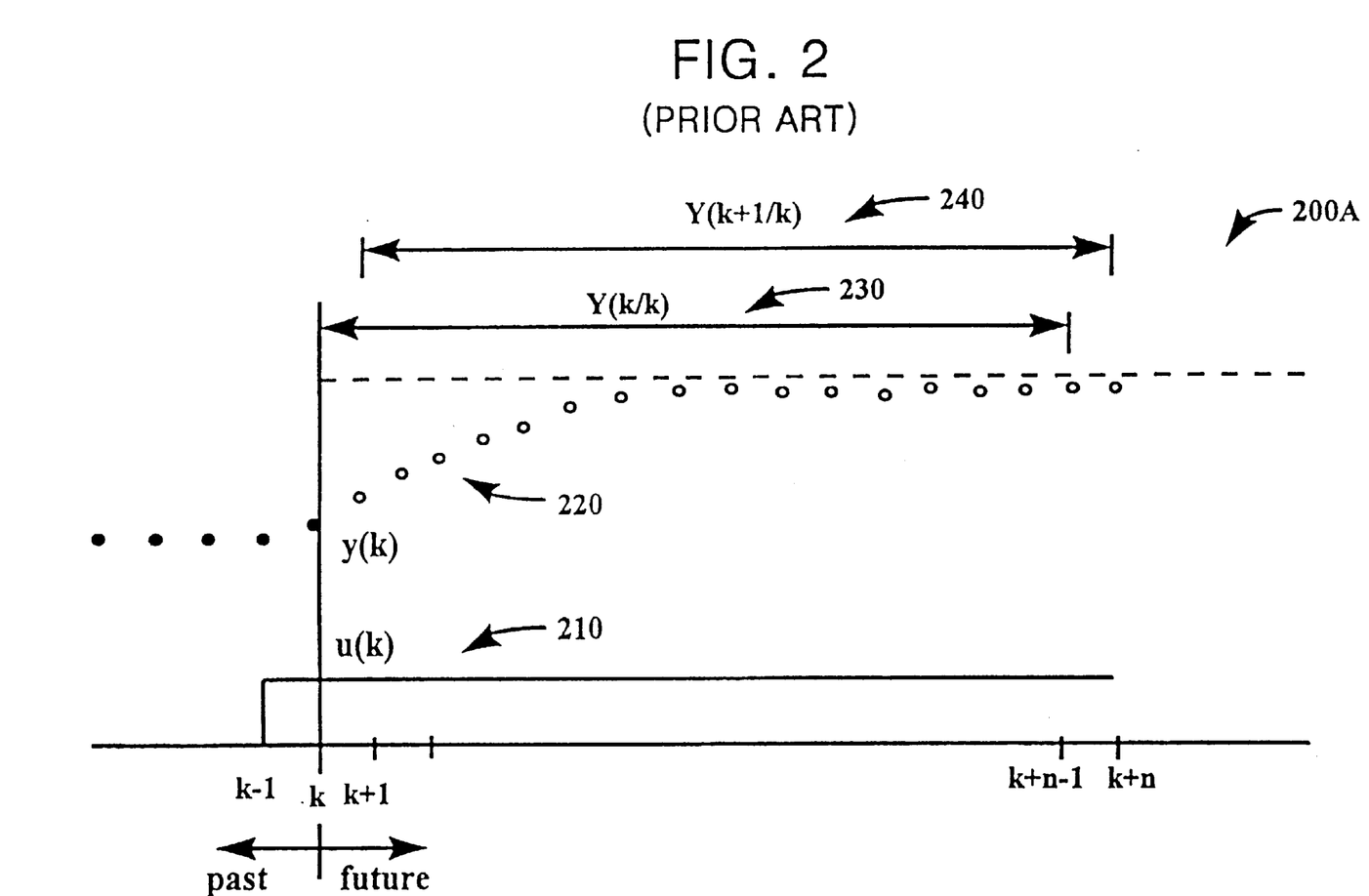
FIG. 2 is a graph illustrating a prediction method at a time k using the conventional predictor.

FIG. 2 is a view illustrating a prediction method at a time k using a conventional predictor.

In FIG. 2, the graph 200 shows the procedure of predicting a variation in the control signal u(k−1) at a time k−1 and a variation in the process output signal y(k) under the condition in which there is no variation in the control signal u(k) after a time k. The prediction vector Y(k/k), 230, of the previous step, corrected based on the process output signal y(k) measured at the time k, corresponds to "[y(k), y(k+1) . . . y(k+n−2), y(k+n−1)]" (Y(k/k)=[y(k), y(k+1) . . . y(k+n−2), y(k+n−1)]). Here, "n" is a value obtained after the process output signal y(k) sufficiently stable. The prediction vector Y(k+1/k), 240, at the time k represents a variation 220 in the process output signal y(k) occurring after a time k+1. The prediction vector Y(K+1/k) has values obtained by shifting values of the prediction vector Y(k/k) obtained after the time k+1 and already corrected at the time k as follows:

$Y(k/k)$ :     $y(k)$     $y(k+1)$     $y(k+2)$     $\cdots$     $y(k+n-2)$     $y(k+n-1)$ $Y(k+1/k)$ :     $y(k+1)$     $y(k+2)$     $y(k+3)$     $\cdots$     $y(k+n-1)$     $y(k+n)$ In accordance with the conventional prediction method, the condition in which y(k+n−1)=y(k+n)=y(k+n+1)= . . . is established after the process is sufficiently stable, as shown by the graph 200A in FIG. 2. Accordingly, the condition in which Y(k+1/k)=[y(k+1), y(k+2) . . . y(k+n−1), y(k+n)] is established.

Since the conventional predictor should be stored with step response coefficients corresponding in number to the model truncating order n, as mentioned above, it requires a large memory capacity. Since the derived prediction vector Y(k+1/k) has a size different from the prediction horizon P used in the controller, there is a disadvantage in that the horizon selection unit 150 should be used to re-arrange the prediction vector Y(k+1/k) in such a manner that it has a size corresponding to the prediction horizon P. For a process including integrating variables, the last column of the vector shift matrix M, namely, [0 0 0 . . . −2 1], should be separately configured. Where a change in the process occurs, it is impossible to achieve an adaptive prediction for deriving again associated model response coefficients.

SUMMARY OF THE INVENTION

Therefore, an object of the invention is to solve the problems involved in the prior art, to provide a hybrid predictor capable of reducing a required memory capacity and achieving an adaptive prediction, and a hybrid prediction method using the hybrid predictor, and to provide a system for and a method of controlling a process using the hybrid predictor and hybrid prediction method, which control system and method are capable of effectively eliminating the disadvantages involved in conventional process control techniques.

In accordance with the present invention, this object is accomplished by providing a hybrid predictor having a configuration modified from the conventional predictor by virtue of an addition of a model parameter estimator and a model response converter. In this configuration, a prediction vector, which is indicative of the length of a prediction horizon, is directly calculated. Accordingly, it is possible to reduce a required memory capacity while updating model response coefficients in accordance with a variation in the process by the model parameter estimator. Thus, an adaptive prediction can be achieved. In accordance with the present invention, a parameter model provided by the model parameter estimator is used in a vector shift method. Accordingly, it is possible to use the same vector shift matrix even for a process involving integrating variables.

In accordance with one aspect, the present invention provides a hybrid predictor comprising: a model parameter estimator for receiving a control signal from a controller included in a process controller and an output signal from a process to be controlled, estimating parameters of a parameter model for minimizing a difference of the process output signal from a model response signal, based on a correlation between the control signal and the process output signal, and outputting the estimated model parameters; a model response converter for receiving the model parameters from the model parameter estimator, and generating unit model response coefficients for respective unit signal elements of the control signal, based on the model parameters; a model response unit for receiving the control signal from the controller, the model response coefficients from the model response converter, and the model parameters from the model parameter estimator, the model response unit serving to generate a model response vector indicative of a process output signal influenced by the control signal input applied to the process at the current time, based on the control signal and the model response coefficients; and a prediction vector unit for receiving the model response vector from the model response unit and the process output signal, the prediction vector unit serving to correct the model response vector, based on the process output signal, thereby outputting a corrected prediction vector.

In accordance with another aspect, the present invention provides a hybrid prediction method used in a process controller for controlling a process, comprising the steps of: measuring a control signal output from a controller included in the process controller and an output signal generated from the process to be controlled, and initializing a prediction vector, based on the output signal from the process; estimating parameters of a parameter model, based on the control signal and the process output signal; and configuring a prediction vector, based on the model parameters, and outputting the configured prediction vector.

In accordance with another aspect, the present invention provides a process controller comprising a controller for receiving an error signal and sending a control signal based on the error signal to a process, thereby controlling the process output signal, a reference value provider for providing a desired reference value, prediction means for receiving the control signal from the controller, thereby outputting a prediction vector signal, and a subtracter for calculating a difference between the reference value signal and the prediction vector signal from the prediction means and sending the calculated difference to the controller as the error signal, wherein the prediction means comprises a hybrid predictor for receiving the control signal from the controller and the process output signal from the process, deriving a parameter model, based on the received signals, and outputting a prediction vector signal indicative of outputs generated from the process during a prediction horizon, based on the parameter model.

In accordance with another aspect, the present invention provides a method for controlling a process, comprising the steps of: measuring a control signal output from a controller included in a process controller, an external disturbance signal, and an output signal generated from the process to be controlled, and initializing a prediction vector, based on the measured process output signal; estimating parameters of a parameter model, based on the control signal, the disturbance signal and the process output signal; configuring the prediction vector, based on the model parameters, thereby outputting the configured prediction vector; deriving a reference value error vector, based on the configured prediction vector and the reference value vector; and calculating a controller output signal, based on the reference error vector and outputting the calculated controller output signal.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 3:
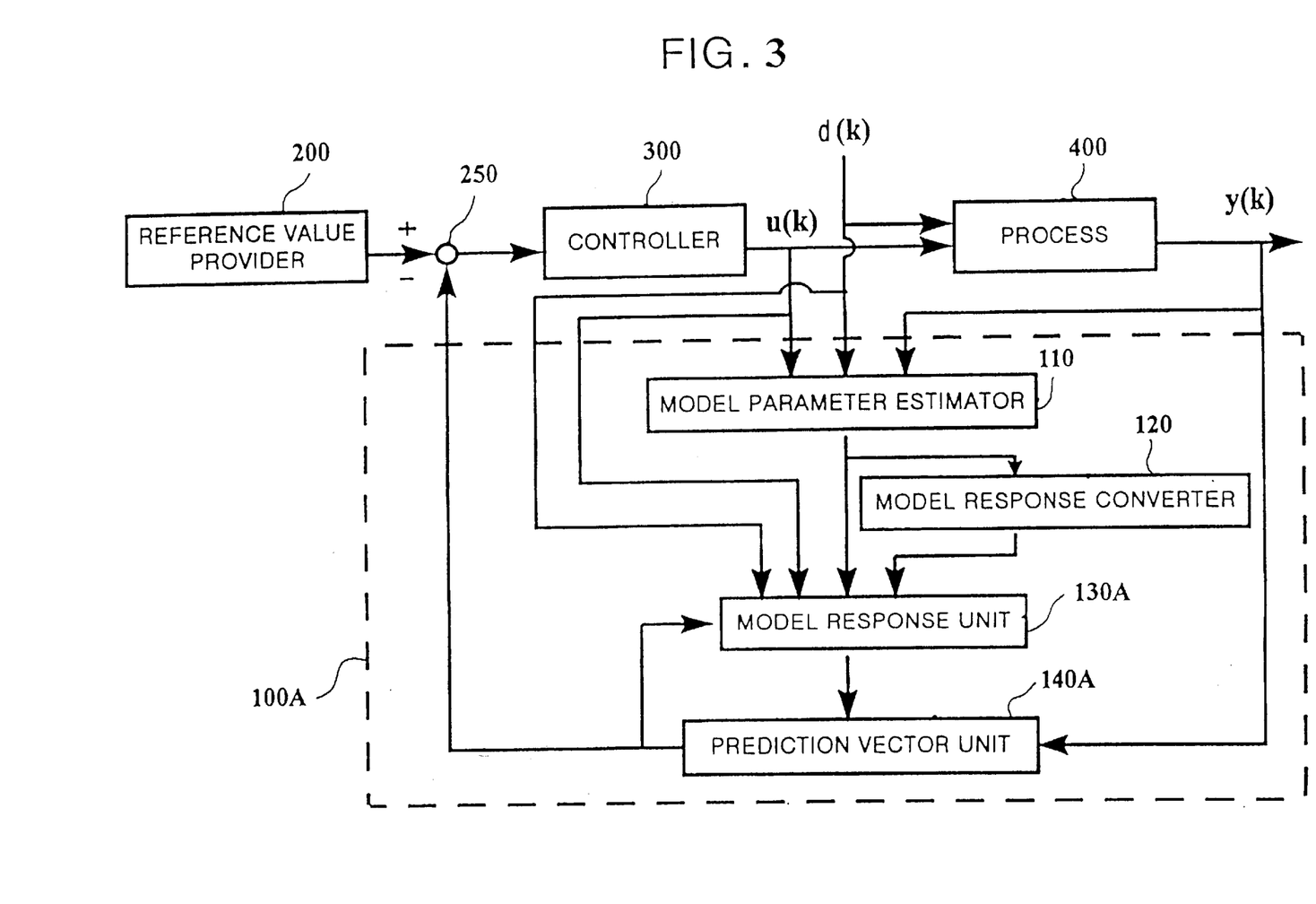
FIG. 3 is a block diagram illustrating a process control loop for controlling a process using a process controller including a hybrid predictor according to the present invention.

FIG. 3 illustrates a process control loop for controlling a process using a process controller including a hybrid predictor according to the present invention. In FIG. 3, elements respectively corresponding to those in FIG. 1 are denoted by the same reference numerals.

As shown in FIG. 3, the process control loop includes a hybrid predictor 100A, a reference value provider 200, a subtracter 250, a controller 300, and a process 400.

The reference provider 200 provides a constant reference value signal. The reference value signal is processed by a subtraction calculation along with a prediction vector signal generated from the hybrid predictor 100A. By this calculation, an error signal is derived.

The subtracter 250 calculates a difference between the reference value signal from the reference value provider 200 and the prediction vector signal from the hybrid predictor 100A, thereby outputting the calculated difference as an error signal.

The controller 300 receives the error signal from the subtracter 250 and sends a control signal based on the error signal to the process 400. That is, the controller 300 controls the process 400 to output a signal indicative of process variables.

The reference provider 200, subtracter 250 and controller 300 have conventional configurations as shown in FIG. 1. Accordingly, no detailed description of such units will be made.

As shown in FIG. 3, the hybrid predictor 100A of the present invention includes a model parameter estimator 110, a model response converter 120, a model response unit 130A, and a prediction vector unit 140A.

The model parameter estimator 110 receives a control signal $u(k-1)$ from the controller 300 and a process output signal $y(k)$ from the process 400, thereby estimating parameters of a parameter model. The parameter estimation is achieved by deriving a correlation between the control signal and process output signal for minimizing a difference of the process output signal from a model response signal. In the parameter estimation, a disturbance signal $d(k-1)$ is reflected which represents a measurable disturbance influencing the process 400.

The model response converter 120 receives a model parameter vector from the model parameter estimator 110 and derives a step response coefficient vector based on the model parameter vector. In other words, the model response converter 120 is a device for converting a parameter model into a response model. Every time a change in the model parameter occurs through the model parameter estimator 110, the model response converter 120 always executes a change in step response coefficient.

The model response unit 130A receives step response coefficients derived by the model response converter 120. This is different from the conventional model response unit 130 which receives step response coefficients from the outside thereof. Based on the step response coefficients, the model response unit 130A outputs a model response vector indicative of a process output signal resulting from signals $u(k-1)$ and $d(k-1)$ applied to the process 400 at the current step. The model response vector has a size corresponding to a prediction horizon P which is used in the controller 300. The model response unit 130A also serves to shift a prediction vector received from the prediction vector unit 140A. For the prediction vector shift, the model response unit 130A uses a model parameter received from the model parameter estimator 110.

The prediction vector unit 140 receives the model response vector from the model response unit 130A and the process output signal $y(k)$ from the process 400. The prediction vector unit 140 corrects the model response vector based on the process output signal $y(k)$, thereby outputting a prediction vector $Y(k/k)$ ($Y(k/k)=[y(k), \ldots, y(k+P-1)]$).

Figure 4:
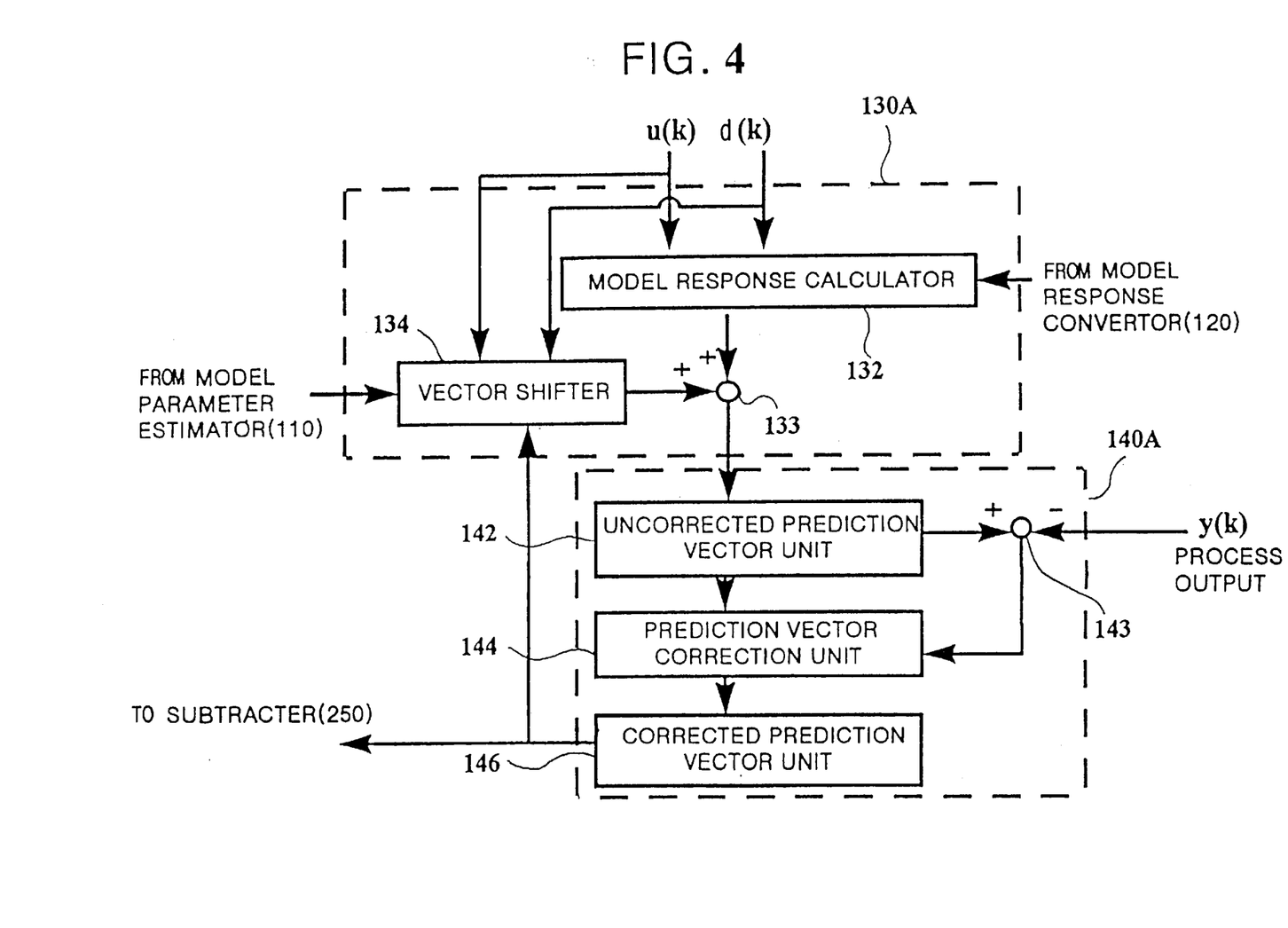
FIG. 4 is a block diagram illustrating detailed configurations of a model response unit and a prediction vector unit included in the hybrid predictor according to the present invention.

FIG. 4 is a block diagram illustrating detailed configurations of the model response unit 130A and prediction vector unit 140A included in the hybrid predictor 100A according to the present invention.

As shown in FIG. 4, the model response unit 130A includes a model response calculator 132, an adder 133 and a vector shifter 134.

The model response calculator 132 receives the control signal $u(k-1)$ and disturbance signal $d(k-1)$, along with step response model vectors $S^u$ and $S^d$ from the model response converter 120. Based on the step response model vectors, the model response calculator 132 calculates the effect of the signals $u(k-1)$ and $d(k-1)$ influencing the process output signal $y(k)$ for the prediction horizon P. The vector shifter 134 serves to shift a prediction vector $Y(k/k)$ associated with the previous step and indicative of $Y(k/k)=[y(k), y(k+1) \ldots, y(k+P-2), y(k+P-1)]$, thereby deriving a prediction vector $Y(k+1/k)$ ($Y(k+1/k)=[y(k+1), y(k+2) \ldots, y(k+P-1), y(k+P)]$). In this case, the last term "$y(k+P)$" is derived using a model parameter $\theta$ sent from the model parameter estimator 110.

The adder 133 adds an output from the vector shifter 134 to an output from the model response calculator 132, thereby outputting a model response vector.

On the other hand, the prediction vector unit 140A includes an uncorrected prediction vector unit 142, a subtracter 143, a prediction vector correction unit 144 and a corrected prediction vector unit 146.

The uncorrected prediction vector unit 142 stores a model response vector received from the model response unit 130A as an uncorrected prediction vector. The uncorrected prediction vector units applies a process prediction signal associated with the current step to the subtracter 143.

The subtracter 143, which receives the current-step process prediction signal from the uncorrected prediction vector unit 142, subtracts the received signal from a process output signal y(k) associated with the current step, thereby outputting the result of the subtraction as a prediction error signal.

The prediction vector correction unit 144 receives the uncorrected prediction vector from the uncorrected prediction vector unit 142 and the prediction error signal from the subtracter 143. Based on the prediction error signal, the prediction vector correction unit 144 corrects the uncorrected prediction vector, thereby outputting a corrected prediction vector.

The corrected prediction vector unit 146 stores the corrected prediction vector output from the prediction vector correction unit 144 and updates the previously stored corrected prediction vector associated with the previous step. The corrected prediction vector unit 146 also sends the corrected prediction vector to the vector shifter 134 of the model response unit 130A and the subtracter 250 of the process controller.

Figure 5:
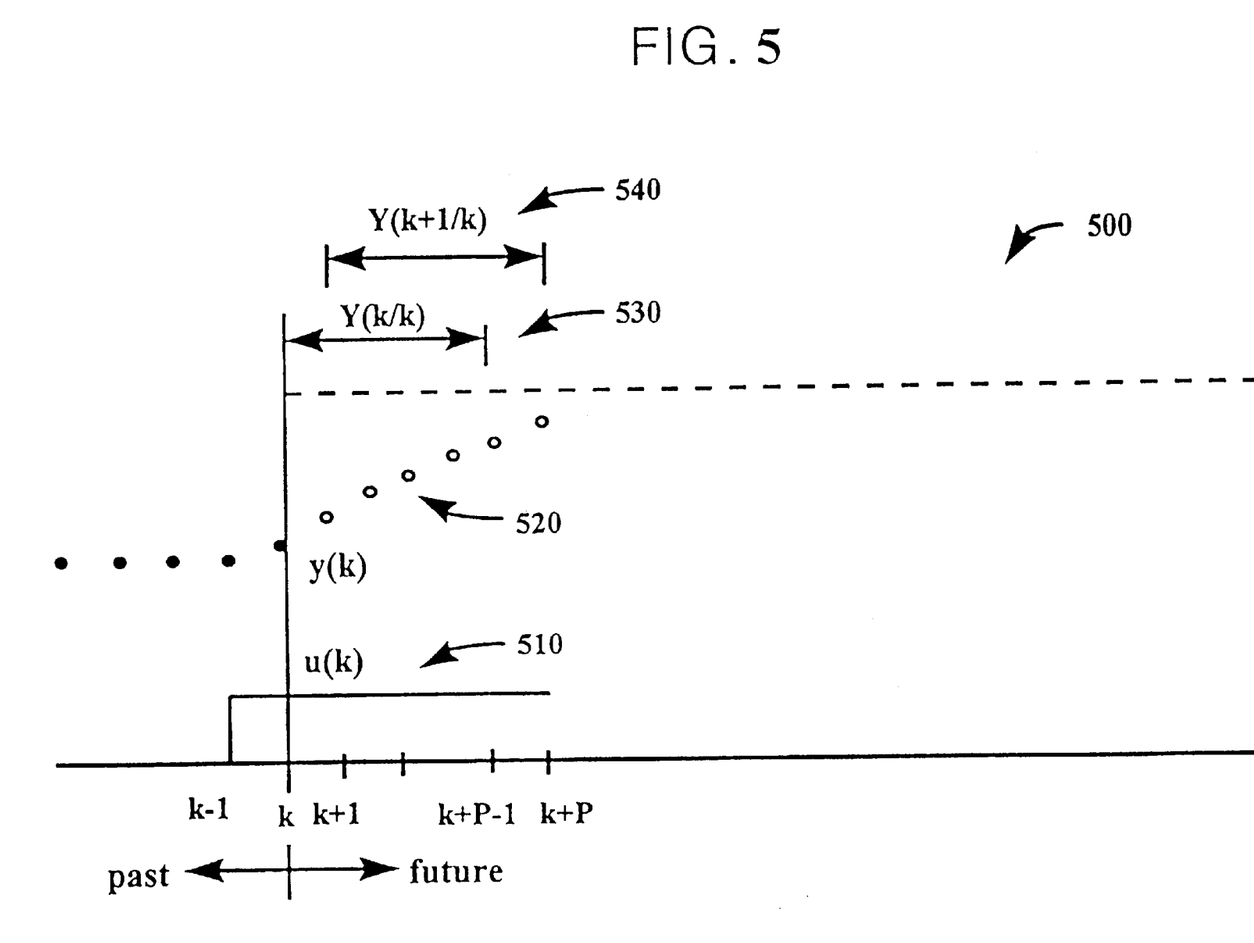
FIG. 5 is a graph depicting a prediction at a time k executed using the hybrid predictor according to the present invention.

FIG. 5 is a graph depicting a prediction at a time k executed using the hybrid predictor according to the present invention.

In FIG. 5, the graph shows the procedure of predicting a variation in the process output signal y(k) in the future under the condition in which $\Delta u(k) = \Delta u(k+1) = \ldots = 0$, where "$\Delta u(k)$" represents a variation, 510, in the control signal u(k−1), as in FIG. 2. The prediction vector Y(k/k), 530, of the previous step corrected based on the process output signal y(k) measured at the time k corresponds to "[y(k), y(k+1) ... y(k+P−2), y(k+P−1)]" (Y(k/k)=[y(k), y(k+1) ... y(k+P−2), y(k+P−1)]). The prediction vector Y(k+1/k), 540, adapted to predict a process output after the time k corresponds to "[y(k+1), y(k+2) ... y(k+P−1), y(k+P)]" (Y(k+1/k)=[y(k+1), y(k+2) ... y(k+P−1), y(k+P)]). The prediction vector Y(k+1/k) has values obtained by shifting values of the prediction vector Y(k/k) obtained after the time k+1 and already corrected at the time k as follows:

$$Y(k/k) : y(k) \quad y(k+1) \quad y(k+2) \quad \cdots \quad y(k+P-2) \quad y(k+P-1)$$
$$\swarrow \quad \swarrow \quad \swarrow \quad \swarrow \quad \swarrow$$
$$Y(k+1/k) : y(k+1) \quad y(k+2) \quad y(k+3) \quad \cdots \quad y(k+P-1) \quad y(k+P)$$

where, "P" represents a prediction horizon which is directly used in the controller. The prediction horizon P has a value less than the model truncating order n used in the conventional technique. In accordance with the present invention, a parameter model is used in order to derive the last term "y(k+P)" which is newly input after the shift. For such a parameter model, the following ARMA (Auto-Regressive Moving Average) model is used:

$$A(q^{-1})y(k) = B(q^{-1})u(k)$$

where, "$q^{-1}$" represents a backwards shift operator, and the polynomials A and B are expressed as follows:

$$A(q^{-1}) = 1 + a_1 q^{-1} + \ldots + a_{na} q^{-na}$$

$$B(q^{-1}) = b_1 + b_2 q^{-1} + \ldots + b_{nb} q^{-nb}$$

where, "$n_a$" and "$n_b$" represent model orders, respectively. These model orders are much smaller than the model truncating order n. Under this condition, the last term "y(k+P)" can be derived as follows:

$$y(k+P) = -a_1 y(k+P-1), \ldots, -a_{na} y(k+P-na) + b_1 u(k-1), \ldots, +b_{nb} u(k-1)$$

where, "$M^a$" and "$M^b$" represent vector shift matrixes, respectively, and "$S^u$" and "$S^d$" represent step response coefficient vectors, respectively. The vector shift matrixes "$M^a$" and "$M^b$" and step response coefficient vectors "$S^u$" and "$S^d$" are expressed as follows:

$$M_a = \begin{bmatrix} 0 & 1 & 0 & \cdots & 0 & 0 \\ \vdots & \vdots & \ddots & \ddots & \vdots & \vdots \\ 0 & 0 & 0 & \ddots & 1 & 0 \\ 0 & 0 & 0 & \ddots & 0 & 1 \\ 0 & 0 & -a_{na} & \cdots & -a_2 & -a_1 \end{bmatrix} \quad M_b = \begin{bmatrix} 0 \\ \vdots \\ 0 \\ 0 \\ \sum_{i}^{nb} \cdot b_i \end{bmatrix} \quad S^u, S^d = \begin{bmatrix} s_1 \\ s_2 \\ \vdots \\ s_{p-1} \\ s_p \end{bmatrix}$$

In this case, the step response coefficients are derived as follows:

$$s_1 = b_1$$

$$s_i = -\sum_{j=1}^{na} a_j s_{i-j} + \sum_{j=1}^{nb} b_j, \; i = 1, 2, \cdots, P$$

Figure 6:
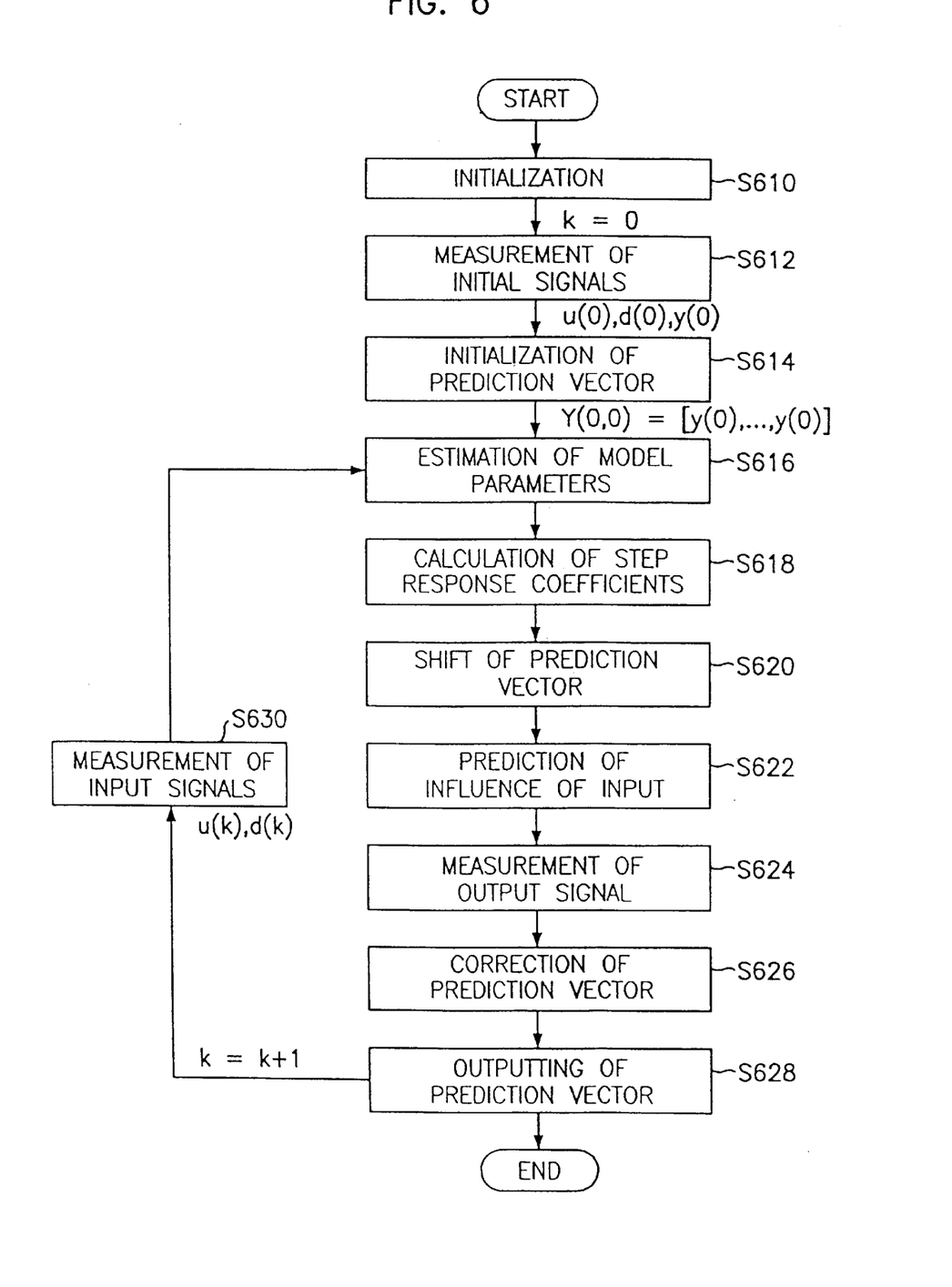
FIG. 6 is a flow chart illustrating a hybrid prediction method carried out using the hybrid predictor in accordance with the present invention.

FIG. 6 is a flow chart illustrating a hybrid prediction method carried out using the hybrid predictor in accordance with the present invention.

In accordance with the hybrid prediction method, the system, namely, the process controller, is first initialized (Step S610). The initialization of the process controller is to stabilize the process 400. The process stabilization means the condition in which the process is in a stable state without a variation in the process output signal because the control signal or disturbance signal is constant. In other words, the control signal u is in a state in which $\Delta u(-1) = \Delta u(-2) = \ldots = 0$, and the disturbance d is in a state in which $\Delta d(-1) = \Delta d(-2) = \ldots = 0$.

Thereafter, measurement of initial signals is executed (Step S612).

That is, the control signal, disturbance signal and process output signal, which are generated at the point of time when a prediction is initially begun, are measured. Thus, an initial control signal u(0), an initial disturbance signal d(0) and an initial process output signal y(0) are obtained. At this time, variations in input signals, namely, variations in the control signal and disturbance signal, are also derived. That is, "$\Delta u(0)$" and "$\Delta d(0)$" are determined as follows:

$$\Delta u(0) = u(0) - u(-1)$$

$$\Delta d(0) = d(0) - d(-1)$$

Subsequently, initialization of a prediction vector is executed (Step S614). The prediction vector initialization is to set elements of the prediction vector by values of the initial process output signals, respectively. The prediction vector Y(0/0) is defined as follows:

$$Y(0/0) = [y(0), \ldots, y(0)]^T$$

The prediction vector has a size corresponding to a prediction horizon P.

Estimation of model parameters is then executed (Step S616). The model parameter estimation is to estimate parameters of the parameter model using the measured input signals (namely, the control signal and disturbance signal) and the output signal (namely, the process output signal). The input and output signals are obtained by a separate input and output signal measurement for the parameter estimation. The model parameters θ have the form of a vector as follows:

$$\theta = [a_1 a_2 \ldots a_{na} b_1 b_2 \ldots b_{nb}]$$

Step response coefficients are then calculated (Step S618).

The step response coefficients are derived using the model parameters θ obtained at the model parameter estimation step S618. Thus, a step response coefficient vector is produced. The derivation of the step response coefficients is carried out under the condition in which u(k−1)=u(k)= . . . =1, as follows:

$$s_1 = b_1$$

$$s_i = -\sum_{j=1}^{na} a_j s_{i-j} + \sum_{j=1}^{nb} b_j, \ i=1, 2, \cdots, P$$

After the calculation of the step response coefficients, the prediction vector is shifted (Step S620).

The prediction vector shift is a step of shifting every element of the stored, corrected prediction vector of the previous time one step into the future. The last element of the shifted vector is derived using the parameter model. The use of the parameter model is to derive the last element of the shifted vector using selected elements of the corrected prediction vector of the previous time and the model parameters of the parameter model.

That is, the prediction vector Y(k/k−1) (Y(k/k−1)=[y(k), y(k+1) . . . y(k+P−2), y(k+P−1)]) of the current time is derived by shifting every element of the corrected prediction vector Y(k−1/k−1) (Y(k−1/k−1)=[y(k−1), y(k) . . . y(k+P−3), y(k+P−2)]) of the previous time one step into the future while newly inputting the last term of the prediction vector Y(k/k−1). The last element "Y(k+P−1)" of the prediction vector Y(k/k−1) is derived using the parameter model, as follows:

$$y(k+P-1) = -a_1 y(k+P-2), \ldots, -a_{na} y(k+P-1-n_a) + b_1 u(k-2), \ldots, +b_{nb} u(k-2)$$

In this case, an influence of the input u exhibited during the prediction horizon P is separately calculated at every scan. The calculated influence at the current scan is superposed with the calculated influence at the previous scan. Accordingly, the condition in which u(k−1)=u(k)=u(k+1)= . . . =u(k+P−1−n_b)=u(k−2) is established.

The influence of the input is then predicted (Step S622).

This step is to predict an influence of the measured input signals (namely, the control signal and disturbance signal) on the process output signal, using the step response coefficients. This step may comprise the steps of deriving a variation in each measured input signal, multiplying the derived variation by every element of the step response coefficient vector, thereby forming a model response vector, and adding the model response vector to the prediction vector produced at the prediction vector shifting step S620, as follows:

$$Y(k/k-1) = Y(k/k-1) + S^u \Delta u(k-1) + S^d \Delta d(k-1)$$

Thereafter, measurement of the process output signal y(k) is executed (Step S624).

The prediction vector is then corrected (Step S626). This correction is carried out by deriving a prediction error, and adding the prediction error to every element of the prediction vector. The prediction error represents the difference between the measured process output signal and an associated element of the uncorrected prediction vector. This correction step may comprise the steps of determining a prediction error, and adjusting every element of the uncorrected prediction vector based on the determined prediction error, thereby producing a corrected prediction vector, as follows:

$$Y(k/k) = Y(k/k-1) + y(k) - NY(k/k-1)$$

$$N = [1\ 0\ 0\ \ldots\ 0\ 0]$$

where, the vector N is used to derive only an element of the uncorrected prediction vector synchronized with the measured process output signal.

Finally, the corrected prediction vector is output (Step S628).

The corrected prediction vector is output so that it is used at the prediction vector shifting step S620 for a subsequent prediction.

In order to derive a prediction vector at the next scan, an input signal measurement step S630 is executed, and the prediction procedure from the model parameter estimation step S616 is repeatedly executed.

Figure 7:
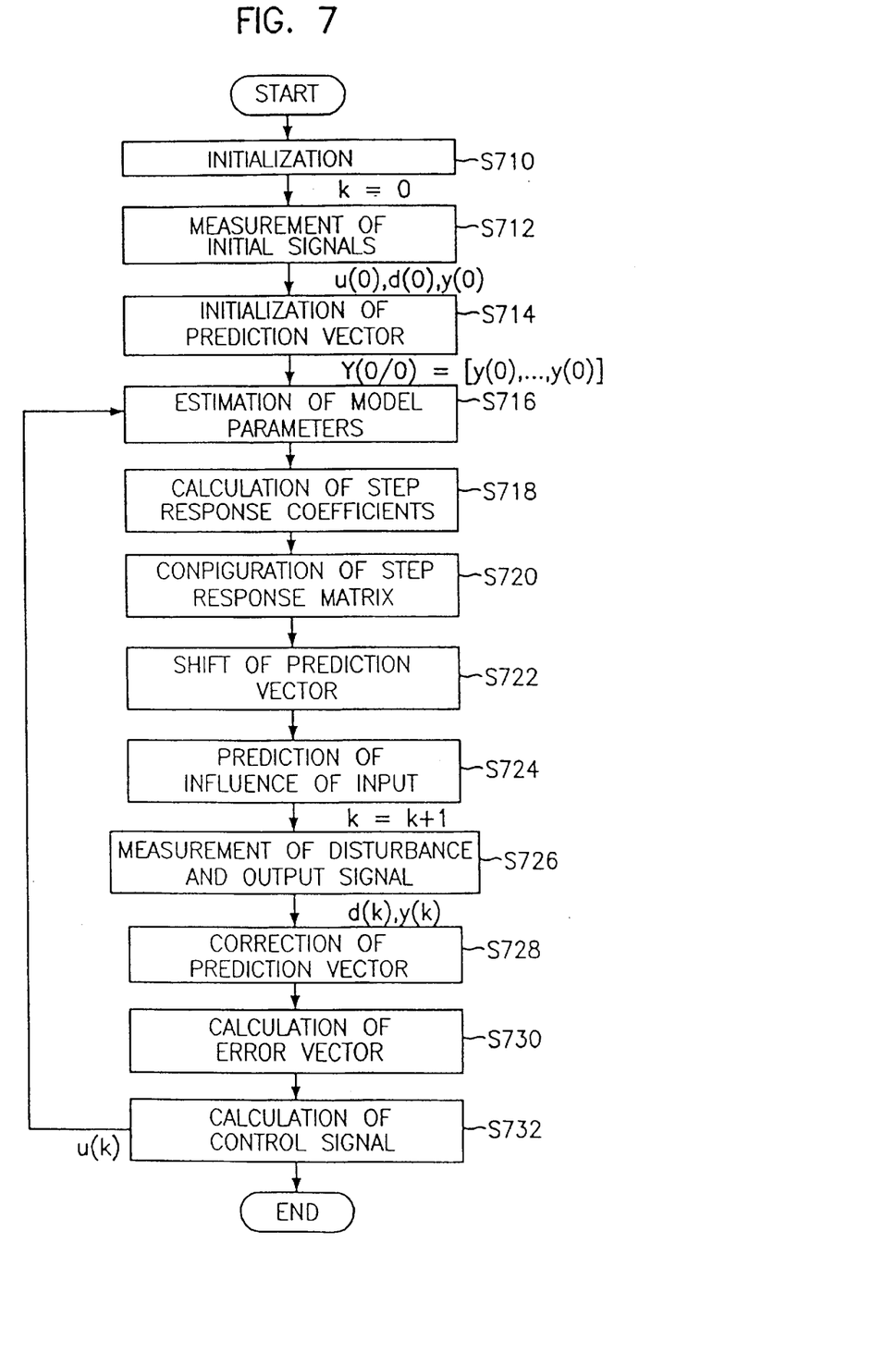
FIG. 7 is a flow chart illustrating a process control method which is carried out using the hybrid prediction method in accordance with the present invention.

FIG. 7 is a flow chart illustrating a process control method which is carried out using the hybrid prediction method in accordance with the present invention.

The steps S710 to S718 of this process control method are the same as the steps S610 to S618 of the hybrid prediction method. In accordance with the process control method, a system initialization of the process controller is first executed (Step S710), and measurement of initial signals is then executed (Step S712). Using the measured initial signals, initialization of a prediction vector is executed (Step S714). Estimation of model parameters is then executed (Step S716). Using the estimated model parameters, step response coefficients are then calculated (Step S718).

Thereafter, a step response matrix is configured (Step S720).

Although the above-mentioned prediction procedure is executed under the assumption in which there is no variation in the control signal for every future scan from the current time (Δu(k)=Δu(k+1)= . . . =0), a series of future control signal values ΔU(k−1) (ΔUk−1)=[u(k−1), u(k), u(k+1) . . . u(k+C−1)]) generated for a control horizon C are calculated using the controller. The step response matrix $S_m^u$ is expressed as follows:

$$S_m^u = \begin{bmatrix} s_1 & 0 & \cdots & 0 \\ s_2 & s_1 & \cdots & 0 \\ \vdots & \vdots & & \vdots \\ s_p & s_{p-1} & \cdots & s_{p-m+1} \end{bmatrix}$$

Subsequently, the prediction vector is shifted (Step S722), as follows:

$$Y(k/k-1) = M_a Y(k-1/k-1) + M_b u(k-2)$$

The influence of the input is then predicted (Step S724), as follows:

$$Y(k/k-1) = Y(k/k-1) + S^u u(k-1) + S^d d(k-1)$$

Thereafter, measurement of the disturbance and output signals d(k) and y(k) is executed (Step S726).

The prediction vector is then corrected (Step S728), as follows:

$$Y(k/k)=Y(k/k-1)+y(k)-NY(k/k-1)$$

$$N=[1\ 0\ 0\ \ldots\ 0\ 0]$$

Thereafter, calculation of an error vector is executed (Step S730).

The error vector represents the difference between a predicted value and a reference value both associated with the process output generated at every scan in the future prediction horizon P from the current time under the condition in which it is assumed that there is no variation in the control signal in the future prediction horizon P ($\Delta u(k)=\Delta u(k+1)=\ldots=0$), as follows:

$$E(k+1/k)=Ysp(k+1/k)-[M_a Y(k/k)+M_b u(k-1)+S^d \Delta d(k)]$$

where, "Ysp(k+1/k)" represents a reference value vector (Ysp(k+1)=[Ysp(k+1), Ysp(k+2), ... Ysp(k+P)]).

Calculation of the control signal is then executed (Step S732).

The calculation of the control signal is carried out using an algorithm for minimizing the difference between the reference value vector and the process output prediction vector (Ysp(k+1/k)−Y(k+1/k)) at every scan in the future horizon P. For example, it is assumed that the calculation of the control signal is carried out using the following minimized objective function:

$$\text{Minimize } \Phi=(Y_{sp}-Y_{pred})^T \Gamma^T \Gamma (Y_{sp}-Y_{pred}) + \Delta u^T \Lambda^T \Lambda \Delta u$$

where, "$Y_{pred}$" is equal to "Y(k+1/k)", and "Γ" and "Λ" are weight vectors, respectively.

If it is assumed that there is no constraint, the following equation is established:

$$\Delta u(k)=N(S_m^{u^T} \Gamma^T \Gamma S_m^u + \Gamma^T \Gamma)^{-1} S_m^{u^T} \Gamma^T \Gamma E(k+1/k)$$

where, $$N=[1\ 0\ 0\ \ldots\ 0]$$

$$E(k+1/k)=Ysp(k+1/k)-[M_a Y(k/k)+M_b u(k-1)+S^d \Delta d(k)]$$

The control signal u(k) derived in the above-mentioned manner is applied to the process 400 which, in turn, generates a process output y(k+1) based on the control signal u(k).

The above control procedure is repeatedly executed from the model parameter estimation step S716.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid predictor comprising:

a model parameter estimator for receiving a control signal from a controller included in a process controller and an output signal from a process to be controlled, estimating parameters of a parameter model for minimizing a difference of the process output signal from a model response signal, based on a correlation between the control signal and the process output signal, and outputting the estimated model parameters;

a model response converter for receiving the model parameters from the model parameter estimator, and generating unit model response coefficients for respective unit signal elements of the control signal, based on the model parameters;

a model response unit for receiving the control signal from the controller, the model response coefficients from the model response converter, and the model parameters from the model parameter estimator, the model response unit serving to generate a model response vector indicative of a process output signal influenced by the control signal input applied to the process at the current time, based on the control signal and the model response coefficients; and a prediction vector unit for receiving the model response vector from the model response unit and the process output signal, the prediction vector unit serving to correct the model response vector, based on the process output signal, thereby outputting a corrected prediction vector.

2. The hybrid predictor in accordance with claim 1, wherein the model parameter estimator comprises a disturbance input unit adapted to receive a disturbance signal indicative of a measurable disturbance influencing on the process so that when the disturbance signal is applied to the disturbance input unit, the model parameter estimator executes the estimation of the model parameter, based on a correlation among the control signal, the disturbance signal and the process output signal.

3. The hybrid predictor in accordance with claim 2, wherein the model response converter serves to update the model response coefficients every time the model parameters are updated.

4. The hybrid predictor in accordance with claim 1, wherein the model response unit comprises:

a model response calculator for receiving the control signal and the model response coefficients and generating a model response vector in response to the control signal;

a vector shifter for receiving a corrected prediction vector from the model parameter estimator associated with the previous time, and shifting the received prediction vector, thereby outputting the shifted prediction vector as a prediction vector associated with the next time; and an adder for adding the prediction vector output from the vector shifter to the model response vector output from the model response calculator.

5. The hybrid predictor in accordance with claim 4, wherein the vector shifter serves to shift one step every elements of the corrected prediction vector associated with the previous time while deriving the value of the final element of the prediction vector to be newly input in the last prediction horizon, based on the model parameters.

6. The hybrid predictor in accordance with claim 4, wherein the model response calculator comprises a multiplier for multiplying the model response coefficients received from the model response converter by a variation in the control signal, respectively, to derive a model response vector indicative of an influence of the control signal on output signals generated in the future from the process.

7. The hybrid predictor in accordance with claim 1, wherein the prediction vector unit comprises:

an uncorrected prediction vector unit for receiving a model response vector from the model response unit as an uncorrected prediction vector, the uncorrected prediction vector unit temporarily storing the uncorrected prediction vector and then outputting the stored uncorrected prediction vector;

a subtracter for receiving the process output signal and deriving a difference between the process output signal and an element of the uncorrected prediction vector output from the uncorrected prediction vector unit at the same time as the process output signal, and outputting the derived difference as a prediction error signal;

a prediction vector correction unit for receiving the uncorrected prediction vector from the uncorrected prediction vector unit and the prediction error signal from the subtracter, the prediction vector correction unit correcting the uncorrected prediction vector, based on the prediction error signal, thereby outputting a corrected prediction vector; and a corrected prediction vector unit for receiving and storing the corrected prediction vector output from the prediction vector correction unit, the corrected prediction vector unit updating the previously stored corrected prediction vector associated with the previous time.

8. The hybrid predictor in accordance with claim 7, wherein the prediction vector correction unit serves to add the prediction error signal to prediction values for future scans stored in the uncorrected prediction vector unit, thereby producing a corrected prediction vector.

9. A hybrid prediction method used in a process controller for controlling a process, comprising the steps of:

measuring a control signal output from a controller included in the process controller and an output signal generated from the process to be controlled, and initializing a prediction vector, based on the output signal from the process;

estimating parameters of a parameter model, based on the control signal and the process output signal; and configuring a prediction vector, based on the model parameters, and outputting the configured prediction vector.

10. The hybrid prediction method in accordance with claim 9, wherein the step of configuring and outputting the prediction vector comprises the steps of:

calculating step response coefficients, based on the model parameters, respectively;

shifting one step every element of a corrected prediction vector associated with the previous time into the future, and outputting the shifted prediction vector;

predicting an influence of the measured control signal on the process output signal, based on the step response coefficients;

measuring the process output signal associated with the current control time; and deriving a prediction error, based on the measured process output signal, adding the prediction error to every element of the prediction vector, storing the result of the addition, and outputting the stored value as a corrected prediction vector.

11. The hybrid prediction method in accordance with claim 10, wherein the step of predicting the influence of the measured control signal based on the step response coefficients comprises:

deriving a variation in a measured input signal applied to the process;

multiplying every element of the step response coefficient vector by the derived input signal variation, thereby producing a model response vector; and adding the model response vector to the prediction vector processed at the prediction vector shifting step.

12. The hybrid prediction method in accordance with claim 11, wherein the step of correcting and outputting the prediction vector comprises the steps of:

determining a prediction error indicative of a difference between the measured process output signal and an element of the uncorrected prediction vector associated with the measured process output signal; and adjusting every element of the uncorrected prediction vector, based on the prediction error, thereby producing a corrected prediction vector.

13. A process controller comprising a controller for receiving an error signal and sending a control signal based on the error signal to a process, thereby controlling the process output signal, a reference value provider for providing a desired reference value, prediction means for receiving the control signal from the controller, thereby outputting a prediction vector signal, and a subtracter for calculating a difference between the reference value signal and the prediction vector signal from the prediction means and sending the calculated difference to the controller as the error signal, wherein the prediction means comprises a hybrid predictor for receiving the control signal from the controller and the process output signal from the process, deriving a parameter model, based on the received signals, and outputting a prediction vector signal indicative of outputs generated from the process during a prediction horizon, based on the parameter model.

14. The process controller in accordance with claim 13, wherein the hybrid predictor comprises:

a model parameter estimator for receiving the control signal from the controller and an output signal from the process to be controlled, estimating parameters of a parameter model for minimizing a difference of the process output signal from a model response signal, based on a correlation between the control signal and the process output signal, and outputting the estimated model parameters;

a model response converter for receiving the model parameters from the model parameter estimator, and generating unit model response coefficients for respective unit signal elements of the control signal, based on the model parameters;

a model response unit for receiving the control signal from the controller, the model response coefficients from the model response converter, and the model parameters from the model parameter estimator, the model response unit serving to generate a model response vector indicative of a process output signal influenced by the control signal input applied to the process at the current time, based on the control signal and the model response coefficients; and a prediction vector unit for receiving the model response vector from the model response unit and the process output signal, the prediction vector unit serving to correct the model response vector, based on the process output signal, thereby outputting a corrected prediction vector.

15. A method for controlling a process, comprising the steps of:

measuring a control signal output from a controller included in a process controller, an external disturbance signal, and an output signal generated from the process to be controlled, and initializing a prediction vector, based on the measured process output signal;

estimating parameters of a parameter model, based on the control signal, the disturbance signal and the process output signal;

configuring the prediction vector, based on the model parameters, thereby outputting the configured prediction vector;

deriving a reference value error vector, based on the configured prediction vector and the reference value vector; and calculating a controller output signal, based on the reference error vector and outputting the calculated controller output signal.

16. The method in accordance with claim 15, wherein the step of configuring and outputting the prediction vector comprises the steps of:

calculating step response coefficients, based on the model parameters, respectively, and configuring a step response matrix, based on the calculated step response coefficients;

shifting one step every element of a corrected prediction vector associated with the previous time into the future, and outputting the shifted prediction vector;

predicting an influence of the measured control signal on the process output signal, based on the step response coefficients;

measuring the process output signal associated with the current control time; and deriving a prediction error, based on the measured process output signal, adding the prediction error to every element of the prediction vector, storing the result of the addition, and outputting the stored value as a corrected prediction vector.

17. The method in accordance with claim 16, wherein the step of configuring the step response matrix based on the calculated step response coefficients comprises the steps of:

configuring the step response matrix in such a manner that the order of a step response coefficient decreases as the number of columns in the step response matrix increases, while using the controller output signal to derive a series of values for the future.

18. The method in accordance with claim 15, wherein the step of deriving the reference value error vector comprises the steps of:

deriving a prediction vector indicative of a process output generated after the point of the current control time, based on the corrected prediction vector; and deriving a reference error vector indicative of a difference between the prediction vector and the reference vector.

19. The method in accordance with claim 15, wherein the step of calculating and outputting the controller output signal comprises the step of calculating a series of future control signals in accordance with an optimizing calculation for making future process output signals reach a reference value in the prediction horizon "P".

* * * * *